United States Patent [19]

Kammeraad

[11] Patent Number: 4,703,580
[45] Date of Patent: Nov. 3, 1987

[54] COLLAPSIBLE PLANAR BOARD

[75] Inventor: James A. Kammeraad, Holland, Mich.

[73] Assignee: K-Line Industries, Inc., Holland, Mich.

[21] Appl. No.: 942,217

[22] Filed: Dec. 16, 1986

[51] Int. Cl.⁴ ............................................. A01K 91/00
[52] U.S. Cl. ..................................... 43/43.13; 428/12
[58] Field of Search ................ 428/12; 43/43.13, 27.4, 43/24.74

[56] References Cited

U.S. PATENT DOCUMENTS

| | | |
|---|---|---|
| 1,307,623 | 6/1919 | Edmonson .......................... 43/43.13 |
| 1,723,236 | 8/1929 | Hansen ................................ 43/43.13 |
| 2,572,427 | 10/1951 | Anglim . |
| 2,582,754 | 1/1952 | Kahler . |
| 2,597,288 | 5/1952 | Caldwell . |
| 2,707,348 | 5/1955 | Kahler . |
| 2,965,998 | 12/1960 | Kuismi . |
| 3,142,929 | 8/1964 | Killilea . |
| 3,216,147 | 11/1965 | Minera . |
| 3,230,660 | 1/1966 | Meyers . |
| 3,410,014 | 11/1968 | Jenssen . |
| 3,464,142 | 9/1969 | Hubbart . |
| 3,470,649 | 10/1969 | Cole . |
| 3,507,068 | 4/1970 | Roberts . |
| 3,748,775 | 7/1973 | Wagner . |
| 3,760,762 | 9/1973 | Spongberg . |
| 3,818,624 | 6/1974 | Duffy . |
| 3,908,299 | 9/1975 | Kalberer . |
| 3,949,512 | 4/1976 | Stegemeyer . |
| 3,973,347 | 8/1976 | Kearney . |
| 4,028,840 | 6/1977 | Wille . |
| 4,524,538 | 6/1985 | Halvorsen . |

Primary Examiner—Alexander S. Thomas
Attorney, Agent, or Firm—Price, Heneveld, Cooper, DeWitt & Litton

[57] ABSTRACT

A planar board is provided for providing a taut rigging line to spread multiple trolling lines over a wide surface area behind a sport fishing boat. The board is collapsible to provide for storage in gunnel shelves or below deck. First and second parallel, generally planar buoyant boards are provided which are interconnected with a collapsible and adjustable metal frame. First and second parallel channels are disposed on opposing sides of the first and second planar boards. The collapsible metal frame includes a beam which extends between the first and second boards, the ends of the beam including first and second bifurcated bracket structures for slidably engaging the parallel channels disposed on opposing sides of the planar boards. A thumb screw sets the relative positions of the bracket structures and the planar boards. The bracket structures are pivotally mounted to the ends of the beam and a leaf spring is disposed atop the beam. First and second latches are disposed on the ends of the leaf spring, the latches extending through the beam and engaging the pivotable bracket structures disposed on the ends of the beam. The latches thus engage the bracket structures to fix the relative orientation of the planar boards and the beam. The leaf spring need only be lifted to release the latches and render the bifurcated bracket structure pivotable for collapsing the device into a compact package for storage.

8 Claims, 4 Drawing Figures

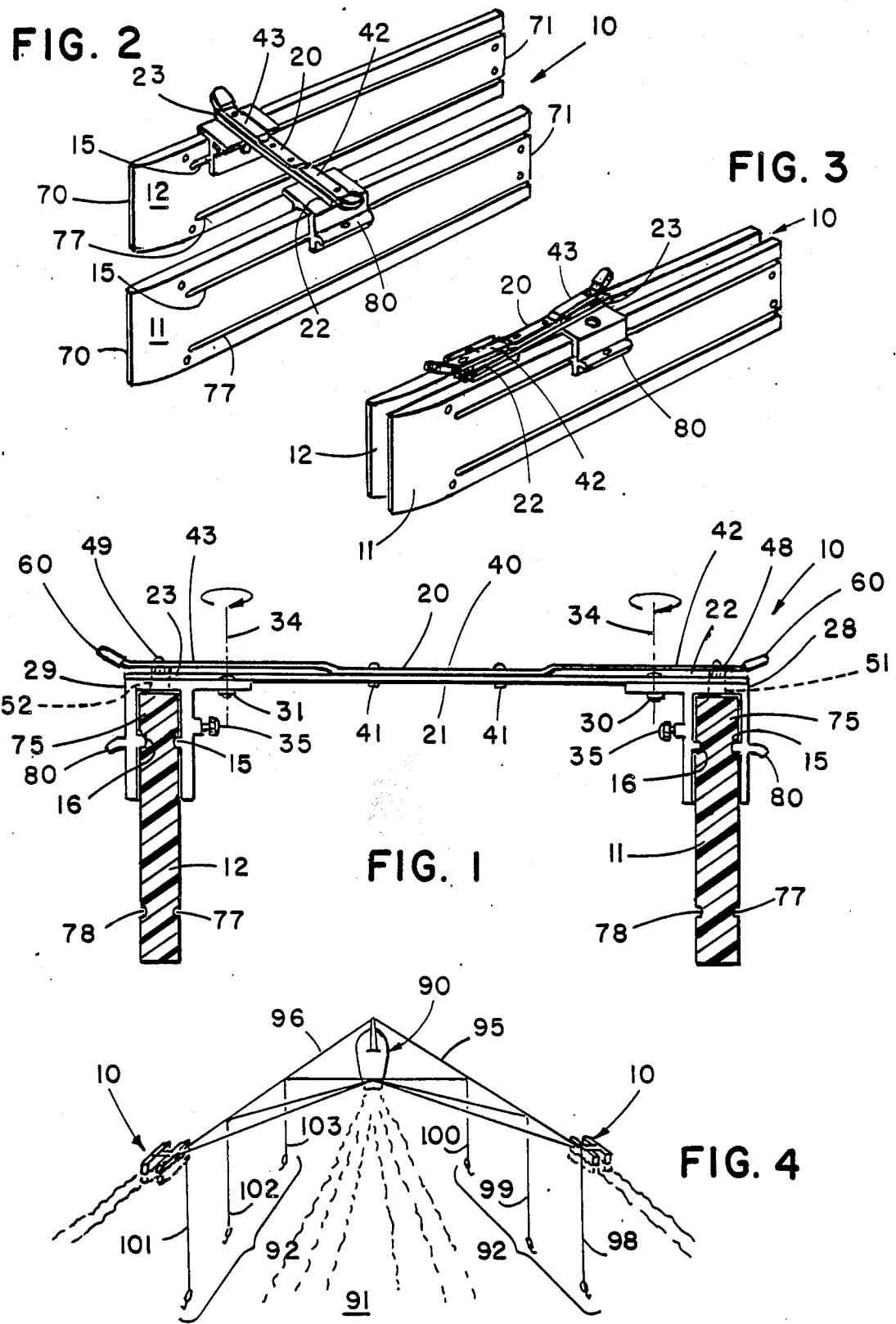

COLLAPSIBLE PLANAR BOARD

BACKGROUND OF THE INVENTION

The invention relates generally to planar boards of the type used to troll surface lines from behind a sport fishing boat and more particularly is directed to a planar board featuring multiple parallel elements which are collapsible into a compact package for storage.

In the art of sport fishing, planar boards are well-known. Planar boards normally comprise a buoyant, generally planar structure which is tethered from the side of the boat where it extends generally parallel to the boat when the boat is trolling to provide a taut rigging line extending between the boat and the planar board for spreading multiple trolling lines over a wide surface area behind the boat. Initially, such planar boards comprised a single buoyant board which was tethered from the side of the boat. However, eventually it was discovered that the stability of the plane and the surface area thereof could be advantageously increased by providing multiple, generally parallel planing boards. The increased tautness of the rigging line or tether facilitated the trolling of multiple lines therefrom. One problem with prior art planar boards employing multiple planing elements involves their size. Often space is at a premium in a sport fishing boat and when the target fish is feeding on the surface, it is normally desirable to use multiple planar boards.

SUMMARY OF THE INVENTION

According to the present invention, these and other problems in the prior art are solved by provision of a collapsible and adjustable planar board having multiple parallel planing elements. More particularly, first and second generally planar boards are provided which are formed from a buoyant material. Each of the boards is provided with first and second parallel channels disposed on opposing sides of the planar boards. A collapsible metal frame is provided for interconnecting the first and second planar boards. The collapsible frame comprises a beam extending between the first and second planar boards, the beam being provided with first and second ends. A first and a second bifurcated bracket structure is provided, the bracket structures being pivotally mounted on the first and second ends of the beam, respectively. The bifurcated bracket structures slidably engage the first and second channels disposed on the tops and on opposing sides of said first and second planar boards. The beam extends between the tops of the planar boards so that the beam and the other connecting structures of the collapsible frame do not drag in the water. The pivotable bifurcated bracket structures facilitate the collapsing or folding of the assembled structure into a flat, compact package no thicker than the thickness of the two planar boards. A thumb screw is disposed on each of the first and second bifurcated brackets for setting the relative positions of each of the planar boards relative to the bracket structures. This adjustment feature allows the user to vary the pulling positions of the boards for different wave conditions and adjust the boards to achieve the most compact package for storage without disassembly of the hardware.

A leaf spring is provided which extends between the first and second planar boards, the leaf spring being disposed atop the beam and secured thereto proximate the middle of the beam. This provides first and second flexible arms which extend over the first and second ends of the beam, respectively. First and second latches are provided which are disposed on the ends of the first and second arms, respectively, of the leaf spring. The latches extend through the beam and engage latch apertures disposed in the first and second bifurcated bracket structures, respectively, for fixing the relative positions of the first and second bifurcated bracket structures relative to the beam extending between the planar boards. The operational positions of the first and second planar boards are thus fixed. The first and second arms of the leaf springs are provided with handles for releasing the latches from the latch apertures disposed in the bifurcated bracket structures and thus releasing the bracket structures for pivoting relative to the beam to effect the collapsing or folding of the planar board structure.

Each of the first and second planar boards are provided with a front end and a back end. The boards are each provided with a curvilinear shape or a beveled front end which facilitates the planing of the board against or away from the trolling boat. The planar boards are provided with a top and a bottom and the first and second channels are disposed adjacent either the top or bottom of the planar boards. Preferably, second and third channels disposed in a parallel fashion on opposing sides of the board are provided at the other of either the top or bottom of the planar boards. Thus, the bracket structures can be used to slidably engage one of either the first and second channels or the second and third channels to configure the planar board either for starboard or port operation.

BRIEF DESCRIPTION OF THE DRAWINGS

FIG. 1 is an elevational view, partially in section, of the collapsible planar board of the present invention;

FIG. 2 is a perspective view of the collapsible planar board of the present invention in an extended or unfolded operational position;

FIG. 3 is a perspective view of the planar board illustrated in FIG. 2 in a collapsed, folded or storage position; and FIG. 4 is a schematic representation of two planar boards extending from the port and starboard sides of a sport fishing boat with multiple surface lines extending from the taut rigging lines which tether the planing boards to the side of the boat.

DESCRIPTION OF THE PREFERRED EMBODIMENTS

With reference now to FIGS. 1 and 2, a collapsible and adjustable planar board constructed according to the present invention is generally illustrated at 10. The planar board 10 is used for spreading fishing lines over a wide surface area behind a sport fishing boat in a trolling operation. The collapsible planar board of the present invention comprises first and second generally planar boards 11 and 12 which are formed from a buoyant material. First and second parallel channels 15 and 16 are disposed on opposing sides of each of the first and second planar boards 11 and 12. A collapsible metal frame 20 is provided which interconnects the first and second planar boards. The collapsible metal frame 20 comprises a beam 21 extending between the first and second planar boards, the beam being provided with first and second ends 22 and 23. First and second bifurcated bracket structures 28 and 29 are provided which are pivotally mounted on the first and second ends 22 and 23 of the beam 20. More particularly, the first and second brackets 28 and 29 are riveted or otherwise suitably pivoted at 30 and 31 so that the brackets 28 and 29 are pivotable about axes 33 and 34, respectively. The first and second bifurcated bracket structures 28 and 29 slidably engage the first and second channels 15 and 16 disposed on opposing sides of the first and second planar boards 11 and 12. Setting devices such as the thumb screws illustrated at 35 are provided on each of the first and second bracket structures 28 and 29 to secure the relative positions of the sliding brackets on the first and second planar boards.

While the positions of the sliding brackets 28 and 29 relative to the planar boards 11 and 12 are fixed by the thumb screws 35, an arrangement for fixing the relative positions of the brackets 28 and 29 about pivot axes 33 and 34 involves the provision of a leaf spring 40 which extends between the first and second planar boards 11 and 12. The leaf spring 40 is disposed atop the beam 21 and is secured thereto by a plurality of rivets 41 proximate the middle of the beam 21. This provides first and second generally flexible arms 42 and 43, which extend over the first and second ends 22 and 23, respectively, of the beam 21. The arms 42 and 43 of the leaf spring are provided with first and second latch members 48 and 49, respectively, which herein comprise a cylindrical Nylon plug which is riveted or otherwise suitably secured to the ends of the arms 42 and 43. When the collapsible planar board is in the extended position, illustrated in FIGS. 1 and 2, the latch members 48 and 49 extend through apertures disposed in the ends 22 and 23 of the beam 21 and into first and second latch apertures 51 and 52 disposed on the first and second bifurcated bracket structures 28 and 29, respectively. Engagement of the latch apertures 51 and 52 with latch members 48 and 49 fixes the relative positions of the bifurcated bracket structures 28 and 29 as well as the first and second planar boards 11 and 12 relative to the beam 21. The latch members and the apertures disposed in each of the bracket structures are oriented such that the first and second planar boards are deployed in a parallel fashion, as illustrated in FIGS. 1 and 2, when the latch members engage the latch apertures. Each of the first and second arms 42 and 43 of the leaf spring 40 is provided with a handle 60 so that the arms of the leaf spring can be manually lifted to disengage latch members 48 and 49 from latch apertures 51 and 52 and thus facilitate the pivoting of the bifurcated bracket structures 28 and 29 relative to the beam 21 to fold the planar boards 11 and 12 into the parallel collapsed position illustrated in FIG. 3. It should be readily appreciated that in the collapsed position illustrated in FIG. 3, the planar board of the present invention presents a compact structure which is easily stored in gunnels or below decks in a sport fishing boat. The collapsed structure is no larger than two of the individual planar elements stacked side-by-side.

With reference now again to FIGS. 1 and 2, it is illustrated that the first and second planar boards 11 and 12 are also preferably provided with a front end 70 and a back end 71. The front end of the planar boards is preferably provided with a beveled or curvilinear shape to cause the planar boards to automatically work against or plane away from the side of the trolling fishing boat. Thus, the planar board structure must assume different configurations when trolled from either the port or starboard side of the boat. According to the present invention, this is facilitated by providing each of the first and second planar boards with first and second channels 15 and 16 disposed near the top ends 75 of the planar boards while providing third and fourth generally parallel channels 77 and 78 disposed near the bottom of each of the planar boards 11 and 12. It should be readily appreciated that the collapsible and adjustable planar board of the present invention can be easily configured for either starboard or port operation by releasing the thumb screws 35 on the bifurcated sliding bracket structures 28 and 29, turning the boards relative to the brackets and engaging the third and fourth channels 77 and 78 disposed on the bottoms of the planar boards.

While a wide range of materials may be used to form the bodies of the first and second planar boards 11 and 12, preferably an injection molded, closed cell, self-skinning polyurethane foam is used to mold the boards. In other embodiments of the invention, a durable and very strong structure was provided by assembling each of the planar boards from vacuum formed halves, clamping the vacuum formed halves together and then injecting the cavity defined therebetween with a suitable polymeric foam.

The beam 21 and the leaf spring 40 are preferably formed from aluminum elements. The bifurcated bracket structures 28 and 29 are preferably formed from aluminum extrusions with eyelets disposed at 80 for connecting a rigging line or tether to the side of the collapsible and adjustable planar board.

With reference now to FIG. 4, the operation of the collapsible and adjustable planar board of the present invention is schematically illustrated. When trolling surface lines behind a sport fishing boat, generally illustrated at 90, it is desirable to keep the surface lures away from the turbulence 91 extending in the wake of the boat. Thus, the planar boards 10 provide a vehicle for spreading multiple fishing lines 92 behind the boat while avoiding the turbulence 91. The collapsible and adjustable planar boards 10 are stowed in the collapsed position, illustrated in FIG. 3. The planar boards are then simply unfolded until the latch members 48 and 49 disposed on arms 42 and 43 of the leaf spring 40 automatically engage the latch apertures 51 and 52 on the bifurcated bracket structures 28 and 29, respectively. This fixes the first and second planar boards 11 and 12 in the generally parallel operational configuration best illustrated in FIG. 2. Thereafter, the first and second planar boards 11 and 12 can be slidably adjusted relative to the brackets 28 and 29 to provide a stable configuration for either starboard or port operation. Once the relative orientations and positions of the planar boards are determined relative to each other and the beam 21 extending therebetween, the thumb screws 35 are used to set the relative positions of the sliding brackets and the planar boards. The planar boards are then tethered from the side of the trolling fishing vessel 90 by rigging or tether lines 95 and 96. The best way to tether the collapsible and adjustable planar boards 10 from the boat 90 is with a stout pole and reel so that the distance between the boat and the planar board can be readily adjusted for various trolling conditions. However, the use of a reel and pole are not mandatory. Once the planar boards are deployed and a suitable trolling speed is established, line releases not illustrated herein, are used to slidably mount a plurality of fishing lines 98 through 103. The fishing lines 98 through 103 are sequentially mounted from the rigging lines with the farthest lines, such as the lines 98 and 101 being first mounted to the tether lines.

These first lines are mounted by releasing a lure and a suitable length of line from the stern of the boat and then attaching the fishing line to one of the sliding releases. Thereafter, the fisherman simply releases a suitable amount of line to permit the sliding release to travel to the desired position on the tether. The more fishing line that is let out, the farther out the release will travel and the farthest lines will simply abut the planing board 10. Lines subsequently mounted to the tethers, such as the lines 99, 100, 102 and 103, are appropriately positioned by letting out less line from the fishing reel. When the target fish strikes, one of the lures thus distributed behind the trolling boat, the speed of the boat and the tension of the fish engaging the lure releases the line from the tether and urges the fish back behind the boat into the turbulent area 91 where the fish is fought. The continual trolling action of the boat tends to keep the fish behind the boat to avoid tangles with either the remaining fishing lines or the tethers and the planar boards.

The above description should be exemplary and that of the preferred embodiment only. Modifications of the invention will occur to those who make and use the invention. It is desired to encompass within the scope of the present invention all such modifications that come within the proper scope of the appended claims.

The embodiments of the invention in which an exclusive property or privilege is claimed are defined as follows:

1. A collapsible and adjustable planar board for spreading fishing lines over a wide surface area when trolling comprising:
    a first and a second generally planar board formed from a material which is buoyant;
    a first and a second parallel channel disposed on opposing sides of each of said first and second planar boards;
    a collapsible metal frame for interconnecting said first and second planar boards, said collapsible frame comprising:
    a beam extending between said first and second planar boards, said beam being provided with first and second ends;
    a first and a second bifurcated bracket structure for slidably engaging said first and second channels disposed in opposing sides of said planar boards, said first and second bifurcated structures being pivotally mounted on the first and second ends of said beam, respectively;
    a setting device on each of said bifurcated structures for setting the relative positions of each planar board and each bifurcated structure;
    a leaf spring extending between said first and second planar boards, said leaf spring being disposed atop said beam and secured thereto proximate the middle of said beam to provide first and second flexible arms extending over said first and second ends of said beam, respectively;
    a first and a second latch disposed on said first and second arms, respectively, of said leaf spring, said latch extending through said first and second ends of said beam to engage said first and second bifurcated structures pivotally mounted on said beam; and
    a first and a second latch aperture disposed on said first and second bifurcated bracket structures, respectively, said first and second latches engaging said first and second latch apertures for fixing the relative positions of said first and second bifurcated bracket structures pivotally mounted on said beam.

2. The collapsible and adjustable planar board of claim 1 wherein said first and second generally planar boards are formed from an injection molded, closed cell, self-skinning polyurethane foam.

3. The collapsible and adjustable planar board of claim 1 wherein said setting device comprises a thumb screw.

4. The collapsible and adjustable planar board of claim 3 wherein said first and second flexible arms are provided with handles to facilitate hand manipulation of said leaf spring and hand actuation of said first and second latches.

5. The collapsible and adjustable planar board of claim 4 wherein said first and second latches each comprise a cylindrical plug which extends through cylindrical beam apertures provided on said beam to register with cylindrical latch apertures provided in said first and second bifurcated structures.

6. The collapsible and adjustable planar board of claim 1 wherein said first and second bifurcated bracket structures are formed from extruded aluminum.

7. The collapsible and adjustable planar board of claim 6 wherein said beam and said leaf spring are formed from aluminum.

8. The collapsible and adjustable planar board of claim 1 wherein each of said first and second planar boards are provided with a front end and a back end, a top and a bottom, said first and second channels being disposed adjacent the top of said planar boards, and each of said planar boards is provided with third and fourth parallel channels disposed on opposing sides of said planar boards adjacent the bottom of said planar boards, whereby said bifurcated structures alternately engage either said first and second channels or said third and fourth channels to set said collapsible and adjustable planar board for either starboard or port operation.

* * * * *